Jan. 9, 1968　　　　　A. BLUMER　　　　　3,362,046
METHOD AND APPARATUS FOR INJECTION MOLDING
Filed Jan. 14, 1965　　　　　　　　　　2 Sheets-Sheet 2

INVENTOR.
ARMIN BLUMER
BY
McGlew & Toren
ATTORNEYS

United States Patent Office 3,362,046
Patented Jan. 9, 1968

3,362,046
METHOD AND APPARATUS FOR
INJECTION MOLDING
Armin Blumer, Schwanden, Switzerland, assignor to
Maschinenfabrik und Giesserei Netstal AG, Netstal,
Glarus, Switzerland
Filed Jan. 14, 1965, Ser. No. 425,589
Claims priority, application Switzerland, Jan. 23, 1964,
786/64
9 Claims. (Cl. 18—30)

ABSTRACT OF THE DISCLOSURE

A method and apparatus for the injection molding of an article which includes a method and an arrangement for directing the material to be formed into a molded article into a mold cavity using a piston member which projects into the cavity so that the article being molded forms around this end.

The mold carrier is then moved away from the piston so that the molded article which is formed around the piston is removed from the cavity. Thereafter, the molded article is stripped from the piston by retracting the piston into a cylinder.

---

This invention relates in general to a method and apparatus for injection molding, and in particular to a new and useful injection molding device including a mold carrier which is movable relative to a liquefying or injection cylinder, the mold carrier including a mold recess for the infeed of material to a mold cavity which recess is larger than the injection cylinder so that an infeed disk of molded material formed in the cavity may be engaged by the injection piston and removed from the mold after the mold carrier is displaced away from the cylinder.

In contrast to thermoplastic materials, the so-called thermosetting plastics can be processed only with difficulty in the usual automatic injection molding machines. Such machines usually include a liquefying cylinder with a piston which is movable therein to inject the injection product into the mold from the liquefying cylinder. One reason for the difficulty in operation of such machines is that, after the injection process, the feed head must be completely and cleanly removed from the liquefying or injection cylinder. Thus, after the injection process both the injection molding and the so-called injection disk must be ejected from the mold.

In a known method for operating such an apparatus, the injection disk is produced in the liquefying cylinder itself so that it is broken away from the mold while the injection piston is returning. In such an arrangement the injection disk is withdrawn into the injection cylinder up to a discharge opening provided in the latter, and means are provided to disconnect it from the piston and to discharge it through the opening. Only after this is done is the two-part mold opened and the molding ejected. With such an arrangement and method the feed head disk or injection disk must be formed strong enough to fit satisfactorily closely in respect to the injection piston during its return stroke so that it will not be disassociated from the latter prematurely, and this requires a relatively great expense for material. In addition, the discharge means which must be associated with the injection cylinder involves a considerable constructional expense.

In accordance with the method of the present invention, the drawbacks of the prior art are avoided by forming the infeed mold or injection disks outside of the injection cylinder and within a cavity defined within the movable mold carrier. The injection piston is formed and located so that the injection disk will be attached to the piston when it is formed. Thus, when the movable mold carrier is moved away from the injection cylinder, the injection disk will be broken from the mold and retained on the injection piston. It then may be easily stripped from the injection piston by withdrawing the piston within the cylinder to cause the injection disk to be stripped from the piston. For this purpose the injection disk must be formed to a larger dimension than the dimension of the injection cylinder. Since with such a method it is not necessary to withdraw the disk through the injection cylinder, there is no reason to form it strong enough so that it will remain securely attached to the piston during this travel. Instead it may be held in a relatively weak manner on the end of the piston and stripped off the piston when the piston is moved backwardly within the injection cylinder. With such an apparatus, and using such a method, jamming of the injection disk in the injection cylinder is avoided and no separate discharge means are required for the injection cylinder.

In a preferred arrangement of the invention, the apparatus includes an injection cylinder which is fed with material to be molded through a hopper connected thereto and which is advantageously mounted in a fixed position. The mold carriers include two movable mold elements, one of which is adapted to be positioned alongside an end of the cylinder and defines a mold recess for the infeed of a mold material to a mold cavity defined on an opposite face. The recess is made larger than the diameter of the injection cylinder and it may be positioned in abutting relationship thereto for receiving the injection material. The opposite face of this movable mold part has a recess in its face which, together with a complementary movable mold part, defines the mold cavity for the object to be molded. The cavity is in communication with the recess for the injection disk.

A fixed cylinder carries an injection piston which may be reciprocated into the injection cylinder to move the material therein into the injection disk cavity and into the passages communicating with the mold cavity of the article to be formed. The piston is of a construction such that the injection disk will be secured to the piston or to an outwardly extending projection thereof, and when the mold carriers are moved away from the injection cylinder, the injection disk will be retained on the piston and be moved outwardly from the mold carrier. Withdrawal of the injection piston into the injection cylinder will then cause the stripping off of the injection disk. The mold carrier elements include means for ejecting the molded article from the mold as they are moved away from the injection cylinder.

Accordingly, it is an object of this invention to provide a method of injection molding using a mold carrier having a recess for the infeed of material which is located for positioning adjacent an injection cylinder which is made to a larger dimension than the cylinder comprising directing the material to be molded into the mold cavity through the recess defined in the mold carrier which is of a larger dimension than the mold cylinder, moving the mold carrier away from the mold cylinder and retaining the injection disk on the injection piston, and returning the piston within the njection cylnder to cause the injection disk to be stripped off the piston.

A further object of the invention is to provide a device for injection molding which includes mold carrier elements which are displaceable relatively to an injection cylinder with a mold cavity defined between the carrier elements which receives material through infeed channels which terminate in an infeed recess dimensioned larger than the dimension of the injection cylinder at an end of the mold carrier face adjacent the injection cylinder, so that an injection disk which will be formed in the cavity will be affixed to the injection piston but will be large enough so that it will not be pulled into the injection cylinder, when the piston is returned, but will be stripped away from the piston.

A further object of the invention is to provide an injection molding device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
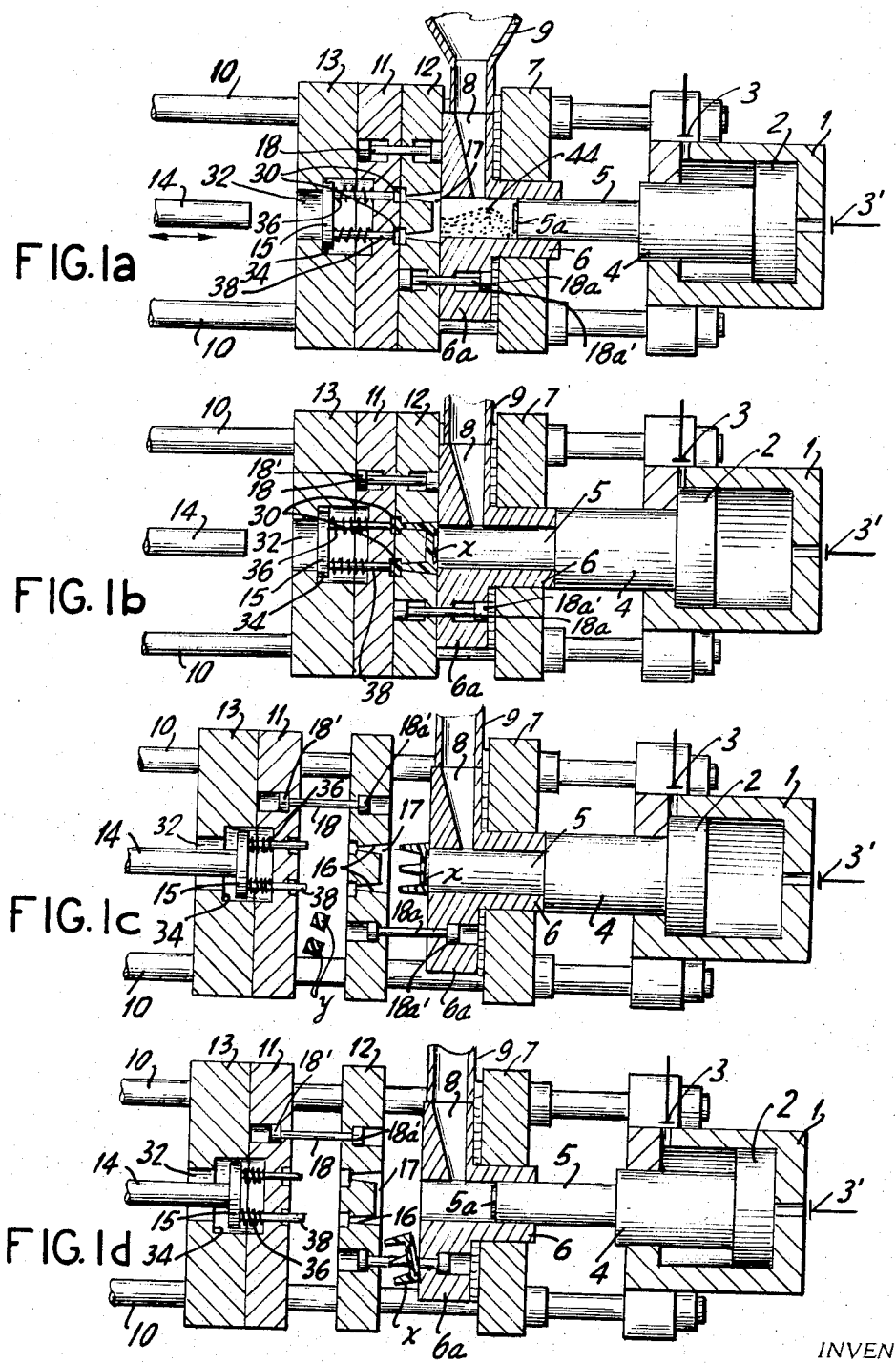
FIG. 1a is a longitudinal sectional view of an injection molding machine constructed in accordance with the invention.
FIGS. 1b, 1c and 1d are views similar to FIG. 1a but indicating the apparatus in various stages of operation.

Referring to the drawings in particular, the invention embodied therein comprises an injection molding apparatus including a pressure-operated cylinder 1 which is supported on a machine foundation (not shown). A working piston 2 is slidable within the cylinder 1 in accordance with which side of the piston 2 a pressure fluid is admitted through one of the valves schematically indicated at 3 and 3'. A piston rod 4 connected to the piston 2 projects outwardly from the cylinder 1 and is provided with an extension 5 which forms an injection piston which is slidable in a liquefying and injection cylinder 6. The injection cylinder 6 is carred in a fixed holding plate 7 and includes a widened disk portion 6a which projects outwardly from the opposite side of the plate 7. A hopper 9 communicates with the interior of a cylinder 6 through a funnel-shaped tube or passageway 8. Material to be injection-molded is directed from the hopper 9 through the passageway 8 to the interior of the cylinder 6.

In accordance with the invention, there is provided a movable mold carrier comprising plate elements or mold plates 11 and 12 which make up the mold, and the closing plate 13. A mold cavity 30 is defined between the plate elements 11 and 12 for molding the article of a desired configuration within the cavity. The mold plate 11 is connected to the closing plate 13, and a disk portion 6a of the injection cylinder 6 forms the closing plate for the opposite side of the plate element 12. A recess 32 is defined within the closing plate 13 and an end face of the mold plate 11 for accommodating an ejector mechanism comprising a plate 15 which is biased against an abutment 34 by spring 36 which are coiled around ejector pins 38.

In accordance with the invention, the movable mold carrier comprising the closing plate 13 and the mold plates 11 and 12 are slidable on the guide rods 10, and when they are moved backwardly away from the injection cylinder 6, an ejector rod 14 will contact the plate 15 and cause the displacement of the plate of the ejector mechanism (as indicated in FIG. 1c) and cause the pins 38 to dislodge the molded parts Y which are formed in the cavity 30.

In accordance with a principal feature of the invention, the mold plate 12 is provided with feed head channels 16 leading to the mold cavities 30, 30 which terminate on the exterior face of the mold plate 12 in a cavity 17 of a greater diameter or radial dimension than the diameter of the cylinder 6 or its greatest radial dimension. There are two feed head channels 16 which lead outwardly to the infeed recess or cavity 17.

The mold plates 11 and 12 are interconnected with play by means of coupling rods 18 having widened ends 18' which ride in enlarged recesses defined in the exterior faces of the respective mold plates 11 and 12. The plates 11 and 12 may be separated by an amount to cause the widened portions 18' of the connecting rods 18 to abut against the inner ends of the recesses in which they are slidable. A similar connection is made between the mold plate 12 and the disk portion 6a of the cylinder 6 by means of rod 18a having widened portions 18a'. Means (not shown) are connected to the mold carrier, including the plates 12, 13 and 14, for moving the plates 11 and 13 together and permitting separate relative movement of the mold plates 11 and 12 as well as the mold plate 12 and the disk portion 6a up to the limit of the length of the connecting links 18 and 18a, respectively.

Figure 2:
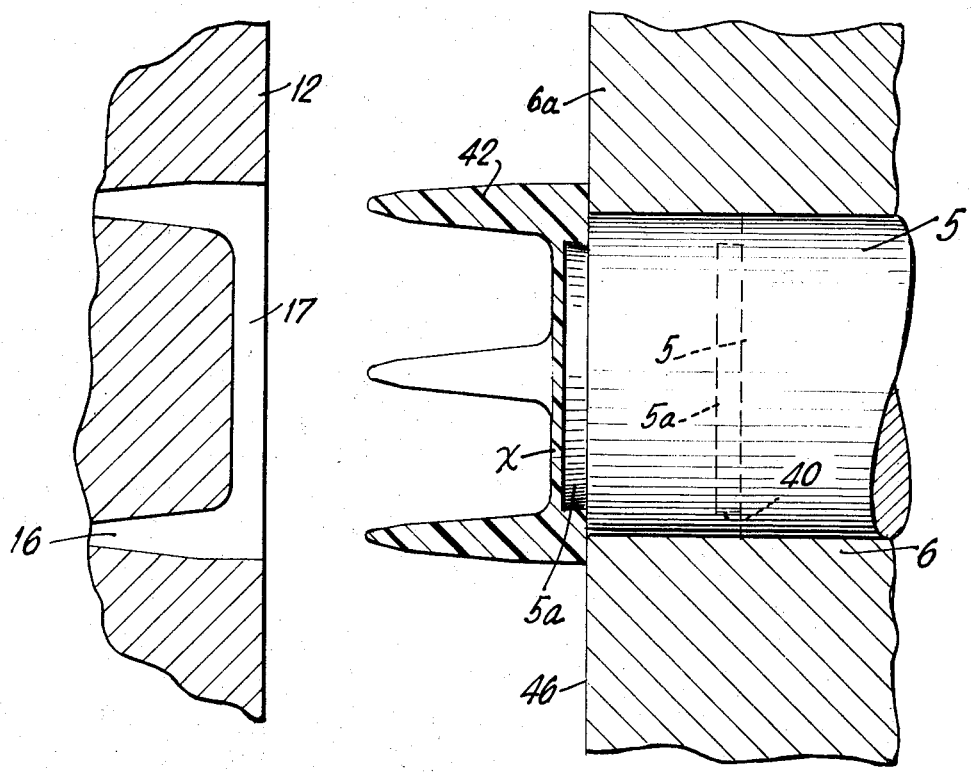
FIG. 2 is an enlarged partial transverse sectional view of the apparatus indicated in FIG. 1a showing the injection disk separated from the mold.

A feature of the invention is that the injection piston 5 is provided with an extension 5a which is made with inwardly tapering ends 40 (see FIG. 2) to form means for engaging an article 42 which will be formed by the infeed of material to the mold cavities 30, 30, so that the article 42 will be retained on piston 5 when the mold carriers are moved away from the disk portion 6a of the cylinder 6. When pressure is admitted through the valve 3' into the cylinder 1, it causes the piston 2 to move to the left and to move the injection piston 5 in the cylinder 6 and cause the material 44 to become liquefied and to be delivered through the recess 17, the feed channels 16, to the mold cavities 30, 30. At the end position of the piston 5, the end face 5a will project outwardly beyond the plane of an end face 46 of the disk portion 6a. The injection disk 42 which is thus formed will become secured to the piston 5. The diameter of the injection article 42 which is formed in the recess 17 is larger than the diameter of the cylinder 6 so that, when the piston 5 is withdrawn; by opening the valve 3' to lower pressure and to apply pressure to the valve 3, to return the piston 2 to the right, the article 42 will be pushed off by the end face 46 of the cylinder 6.

The device is operated as follows: The starting position is indicated in FIG. 1a. The mold carrier is moved so that the mold cavity 30 is closed and the mold plate 12 is pushed into abutting relationship with the disk portion 6a of the injection cylinder 6. With the injection piston 5 located to the right of the cylinder, as indicated in FIG. 1a, material to be molded is directed through the channel 8 and into the cylinder, as indicated at 44. The injection material comprises a plastic materal which may be a powder or granulate and is usually fed in a preheated condition in a quantity suitable for completely filling the mold cavities 30, 30 and the infeed channels 16 and the recess 17 when the piston 5 is moved fully to the left.

The working piston 2, and therefore also the injection piston 5, is moved forward, that is, toward the left, as indicated in the drawings, to compress the charge of plastics material and to soften the same and to thereafter press the softened mass through the recess 17 and the channel 16 into the mold cavities 30, 30. At the end of the injection stroke the front face of the cylinder 5 will be substantially flush with the wall 46 with the exception of the projection 5a which will extend into the recess 17. As soon as the mass of plastic material hardens, the article 42 is formed and is affixed to the piston 5 through the projection 5a. At this stage the article 42 is located completely within the mold plate 12.

By means of an operating member (not shown) the closing plate 13 is then moved toward the left, as viewed in the drawing, to open the mold. The closing plate 13, and therefore also the mold plate 11 connected thereto, is then moved first away from the mold plate 12 by the clearance provided by the coupling rods 18, whereupon the mold is opened. By further moving of the closing plate 13, the mold plate 12 is also moved away from the widened portion disk 6a through the action of the coupling rods 18a and 18 (position indicated) in FIGS. 1c and 2). During the withdrawal of the closing plate 13, the article 42 is separated from the mold plate 11, and closing plate 13 is moved to cause the rod 14 to move against the plate 15 of the ejector mechanism to dislodge the molded parts y. In this position (FIG. 1c), the pins 38 project into the mold cavities 30, 30 to dislodge the molded parts y.

Thereafter the injection piston 5 is returned to its initial starting position to the right of the drawing, as indicated in FIG. 1d, and the article 42 is dislodged from the end thereof, since it is too large to pass through the bore of the cylinder 6.

A principal aspect of the invention is that the article 42 with radially larger dimensions than the bore of the injection cylinder 6, is produced completely outside of the injection cylinder and is held securely by the injection piston 5 until the molded parts y are first separated from the mold cavities defined by the mold plates 11 and 12. The principal element of the device is that the mold plate 12 must have a cavity 17 which includes one radial dimensional portion which is larger than the maximum radial dimension of the injection cylinder 6.

The apparatus described is not only simple in construction and operationally certain, but it also makes possible the positioning of the injection cylinder on a solid mounting for the machine. Only the mold or its insertion need be changed but not the injection cylinder, since the latter will not become clogged with the infeed materials formed on the mold.

While a specific embodiment of the invention has been shown and described in detail to illustrate the application of the inventive principles, it will be understod that the invention may be embodied otherwise without departing from such principles.

What is claimed is:

1. A method of injection molding an article, particularly with plastic materials using mold carrier plate, having an infeed recess for the infeed of material on a side face which communicates with a mold cavity defined on the plate and which recess is adapted to align with the pressure cylinder when the carrier plate is positioned to abut against an end face of the cylinder and in which the recess defined in the carrier plate is of a larger radial dimension than the maximum radial dimension of an injection and liquefying cylinder, and further using an injection piston slidable in the injection cylinder which has a projecting portion adapted to project into the recess of the mold carrier plate after injection is completed, comprising moving the piston in the injection cylinder to compress and liquefy the plastic material and to feed it into the mold cavities through the infeed recess and locating the end of the piston in the recess thereafter so that the molded article will form around the piston, moving the mold carrier away from the injection cylinder to separate the molded article from the mold and from the parts molded in the mold cavity, and stripping the molded article from the piston by moving the piston backwardly in the injection cylinder.

2. A method of injection molding an article, particularly in plastic materials using an infeed mold carrier plate, having a recess for the infeed of material on a side face which communicates with the mold cavity defined on the plate and which recess is adapted to align with the pressure cylinder when the carrier plate is positioned to abut against an end face of the cylinder and in which the recess defined in the carrier plate is of a larger radial dimension than the maximum radial dimension of an injection and liquefying cylinder, and further using an injection piston slidable in the injection cylinder which has a projecting portion adapted to project into the recess of the mold carrier plate after injection is completed, comprising moving the piston in the injection cylinder to compress and liquefy the plastic material and to feed it into the mold cavities through the infeed recess and locating the end of the piston in the recess so that the molded article will form around the piston, separating the mold carrier parts at the plane of the cavity for the molding part and simultaneously ejecting the molded part from the cavity, thereafter moving the mold carrier away from the injection cylinder to separate the molded article from the mold, and stripping the molded article from the piston by moving the piston backwardly in the injection cylinder.

3. An injection molding device comprising a liquefying and injection cylinder, an injection piston having a projection slidable in said injection cylinder, a movable mold carrier having a material infeed recess defined in an end face thereof which is aligned with said injection cylinder, the infeed recess being of a larger dimension than said injection cylinder, means for directing material to be molded into said injection cylinder, means for moving said injection piston to a location at which at least an end portion projects into the recess of said mold carrier, the movement of said piston in said cylinder acting to compress and soften said material in said injection cylinder and thereafter to force the material out of the cylinder through the infeed recess and into the mold cavity to form a molded part in the mold cavity and a molded article in the recess, the molded article being formed around the projection of said piston and being affixed to said piston, said mold carrier being displaceable away from said injection cylinder to cause the molded article to be stripped away from said mold carrier, said piston being retractable in said injection cylinder to strip the molded article from said piston.

4. An injection molding device comprising a liquefying and injection cylinder, an injection piston slidable in said injection cylinder, a movable mold carrier including first and second mold plates together defining a mold cavity of the configuration of a mold part to be molded, said plates being separable to open the mold cavity, said first mold plate having a material infeed recess defined in an end face thereof which is aligned with said injection cylinder, the infeed recess being of a larger dimension than said injection cylinder, the infeed recess extending into communication with said mold cavity in said mold carrier, means for directing material to be molded into said injection cylinder, means for moving said injection piston to a location at which at least an end portion projects into the recess of said mold carrier, the movement of said piston in said cylinder acting to compress said material in said injection cylinder and to force the material out of the cylinder through the infeed recess and into the mold cavity to form a molded part in the mold cavity and a molded article in the infeed recess which is affixed to said piston, said mold carrier being displaceable away from said injection cylinder to cause the molded article to be stripped away from said mold carrier, said piston being retractable in said injection cylinder to strip the molded article from said piston.

5. An injection molding device comprising a liquefying and injection cylinder, an injection piston slidable in said injection cylinder, a movable mold carrier including first and second mold plates together defining a mold cavity of the configuration of a mold part to be molded, said plates being separable to open the mold cavity, said first mold plate having a material infeed recess defined in an end face thereof which is aligned with said injection cylinder, the infeed recess being of a larger dimension than said injection cylinder, the infeed recess extending into communication with said mold cavity in said mold carrier, means for directing material to be molded into said injection cylinder, means for moving said injection piston to a locaton at which at least an end portion projects into the recess of said mold carrier, the movement of said piston in said cylinder acting to compress said material in said injection cylinder and to force the material out of the cylinder through the infeed recess and into the mold cavity to form a molded part in the mold cavity and a molded article in the infeed recess affixed to said piston, said mold carrier being displaceable away from said injection cylinder to cause the molded article to be stripped away from said mold carrier, said piston being retractable in said injection cylinder to strip the molded article from said piston, said plates being separable to open the mold cavity, means coupling said first and second plates together permitting limited movement toward and away from each other, and means coupling said first mold plate to said injection cylinder permitting limited movement toward and away from each other.

6. An injection molding device comprising a liquefying and injection cylinder, an injection piston slidable in said injection cylinder, a movable mold carrier including first and second mold plates together defining a mold cavity of the configuration of a mold part to be molded, said plates being separable to open the mold cavity, said first mold plate having a material infeed recess defined in an end face thereof which is aligned with said injection cylinder, the infeed recess being of a larger dimension than said injection cylinder, the infeed recess extending into communication with said mold cavity in said mold carrier, means for directing material to be molded into said injection cylinder, means for moving said injection piston to a location at which at least an end portion projects into the recess of said mold carrier, the movement of said piston in said cylinder acting to compress said material in said injection cylinder and to force the material out of the cylinder through the infeed recess and into the mold cavity to form a molded part in the mold cavity and a molded article in the infeed recess affixed to said piston, said mold carrier being displaceable away from said injection cylinder to cause the molded article to be stripped away from said mold carrier, said piston being retractable in said injection cylinder to strip the molded article from said piston, said plates being separable to open said mold cavity, and ejector means associated with one of said plates for ejecting the molded part from said cavity.

7. An injection molding device comprising a liquefying and injection cylinder, an injection piston slidable in said injection cylinder, a movable mold carrier including first and second mold plates together defining a mold cavity of the configuration of a mold part to be molded, said plates being separable to open the mold cavity, said first mold plate having a material infeed recess defined in an end face thereof which is aligned with said injection cylinder, the infeed recess being of a larger dimension than said injection cylinder, the infeed recess extending into communication with a mold cavity in said mold carrier, means for directing material to be molded into said injection cylinder, means for moving said injection piston to a location at which at least an end portion projects into the recess of said mold carrier, the movement of said piston in said cylinder acting to compress said material in said injection cylinder and to force the material out of the cylinder through the infeed recess and into the mold cavity to form a molded part in the mold cavity and a molded article in the infeed recess affixed to said piston, said mold carrier being displaceable away from said injection cylinder to cause the molded article to be stripped away from said mold carrier, said piston being retractable in said injection cylinder to strip the molded article from said piston, said plates being separable to open said mold cavity, and ejector means associated with one of said plates for ejecting the molded part from said cavity, including a recess defined in said mold cavity, a plate confined in said recess, means biasing said plate against one end of said recess, said plate having a pin projecting outwardly from said plate to said mold cavity, and means for displacing said plate to cause said pin to be moved into said mold cavity for ejecting a molded part therefrom.

8. An injection molding device comprising a liquefying and injection cylinder, an injection piston having a projection slidable in said injection cylinder, a movable mold carrier having a recess defined in an end face thereof which is aligned with said injection cylinder, said recess being of a larger dimension than said injection cylinder and extending into an infeed passageway communicating with a mold cavity in said mold carrier, means for directing material to be molded into said injection cylinder, means for moving said injection piston to a location at which at least an end portion projects into the recess of said mold carrier, the movement of said piston in said cylinder acting to compress said material in said injection cylinder and to force the material out of the cylinder and into the mold cavity, the infeed passages and the recess whereby to form a molded part in the mold cavity and an article in the recess and the infeed passage, said article being formed around a projection of said piston and being affixed to said piston, said mold carrier being displaceable away from said injection cylinder to cause said article to be stripped away from said mold carrier, said piston being retractable into said injection cylinder to strip said article from said piston, said injection cylinder including a widened disk portion, said mold carrier having first and second mold plates, said first mold plate adapted to abut against said widened disk portion of said injector cylinder to align the recess defined in said mold carrier with said injection cylinder.

9. An injection molding device comprising a liquefying and injection cylinder, an injection piston slidable in said injection cylinder, a movable mold carrier having a recess defined in an end face thereof which is aligned with said injection cylinder, said recess being of a larger dimension than said injection cylinder and extending into an infeed passageway communicating with a mold cavity in said mold carrier, means for directing material to be molded into said injection cylinder, means for moving said injection piston to a location at which at least an end portion projects into the recess of said mold carrier, the movement of said piston in said cylinder acting to compress said material in said injection cylinder and to force the material out of the cylinder and into the mold cavity, the infeed passages and the recess to form a molded part in the mold cavity and an article in the recess and the infeed passage, said injection disk being formed around a projection of said piston and being affixed to said piston, said mold carrier being displaceable away from said injection cylinder to cause said article to be stripped away from said mold carrier, said piston being retractable in said injection cylinder to strip said article from said piston, a fixed pressure cylinder, a pressure piston slidably mounted in said cylinder and connected to said injection piston, and means for directing pressure fluid to said pressure cylinder for displacing said pressure piston and said injection piston in one direction for liquefying and compressing material and directing it into the mold cavity and in an opposite direction for stripping the injection disk from the injection piston.

References Cited

UNITED STATES PATENTS

| | | | |
|---|---|---|---|
| Re. 19,000 | 11/1933 | Scribner | 264—318 |
| 1,916,495 | 7/1933 | Shaw | 264—328 |
| 2,890,491 | 6/1959 | Hendry. | |
| 2,834,989 | 5/1958 | Kusnery | 18—2 X |
| 3,013,308 | 12/1961 | Armour | 18—2 X |
| 3,161,918 | 12/1964 | Zearbaugh | 18—2 X |
| 3,174,187 | 3/1965 | Schriever. | |
| 3,208,113 | 9/1965 | Bennett. | |

WILLIAM J. STEPHENSON, *Primary Examiner.*